United States Patent
Hsu et al.

(10) Patent No.: US 10,627,579 B2
(45) Date of Patent: Apr. 21, 2020

(54) OPTICAL FIBER SPLICING DEVICE

(71) Applicants: Gloriole Electroptic Technology Corp., Kaohsiung (TW); SHEN ZHEN WONDERWIN TECHNOLOGY CO., LTD., Shenzhen, Guangdong Province (CN)

(72) Inventors: Shu-Hui Hsu, Kaohsiung (TW); Yen-Chang Lee, Kaohsiung (TW)

(73) Assignees: GLORIOLE ELECTROPTIC TECHNOLOGY CORP., Kaohsiung (TW); SHEN ZHEN WONDERWIN TECHNOLOGY CO., LTD., Shenzhen, Guangdong Province (CN)

( * ) Notice: Subject to any disclaimer, the term of this patent is extended or adjusted under 35 U.S.C. 154(b) by 0 days.

(21) Appl. No.: 16/242,308

(22) Filed: Jan. 8, 2019

(65) Prior Publication Data

US 2019/0227238 A1 Jul. 25, 2019

(30) Foreign Application Priority Data

Jan. 24, 2018 (TW) .............................. 107201168 A

(51) Int. Cl.
*G02B 6/38* (2006.01)
*G02B 6/44* (2006.01)

(52) U.S. Cl.
CPC ......... *G02B 6/3825* (2013.01); *G02B 6/3806* (2013.01); *G02B 6/389* (2013.01); *G02B 6/3849* (2013.01); *G02B 6/3897* (2013.01); *G02B 6/4459* (2013.01); *G02B 6/4471* (2013.01)

(58) Field of Classification Search
CPC .. G02B 6/3825; G02B 6/3806; G02B 6/3849; G02B 6/389; G02B 6/3897; G02B 6/4459; G02B 6/4471
USPC .......................................................... 385/60
See application file for complete search history.

(56) References Cited

U.S. PATENT DOCUMENTS

2019/0170961 A1* 6/2019 Coenegracht ........ G02B 6/4444

* cited by examiner

*Primary Examiner* — Jerry M Blevins
(74) *Attorney, Agent, or Firm* — Muncy, Geissler, Olds & Lowe, PC

(57) ABSTRACT

A fiber optic cable splice device includes a sleeve, an inner tube received in the sleeve to allow passage of a fiber optic cable, and a limiting member coupled to the sleeve and limiting the limiting member in the sleeve. A casing is connected to the sleeve at a top end thereof, a joining portion extending sideward from a sidewall thereof, and a bent passage extending through the top end and the joining portion. A rotary connection member is rotatably positioned on the joining portion, and has a threaded plug. When the rotary connection member is rotated relative to the casing, the threaded plug is able to be threaded into a fitting device so that the fiber optic cable is connected to the fitting device.

4 Claims, 9 Drawing Sheets

OPTICAL FIBER SPLICING DEVICE

CROSS-REFERENCE TO RELATED APPLICATION

This application claims priority of Taiwanese Patent Application No. 107201168, filed on Jan. 24, 2018.

FIELD

The disclosure relates to a splice device, and more particularly to an optical fiber splice device.

BACKGROUND

FIGS. 1 and 2 illustrate an existing fiber optic cable splice device 1 suitable for a fiber optic cable 10. The existing fiber optic cable splice device 1 includes a sleeve 11 having a receiving space 110, a cable passage tube 12 that has a passage 120 for receiving the fiber optic cable 10 and that is positioned in the receiving space 110, and a limiting member 13 that is connected to the sleeve 11 and that limits the cable passage tube 12. The sleeve 11 includes a main body 111 that has opposite first and second ends 118, 119, and a threaded portion 112 extending integrally from the first end 118. A thread section 117 is formed on an inner surface of the second end 119 of the main body 111. The cable passage tube 12 includes a tube body 121 and a tail part 122 integrally and curvedly extending from an end of the tube body 121. The limiting member 13 includes a connection portion 131 threadedly connected to the thread section 117 and abutting the cable passage tube 12, and an abutment portion 132 connected to the connection portion 131 and exposed from the receiving space 110. The abutment portion 132 abuts the second end 119 of the main body 111. A through hole 130 extends through the connection portion 131 and the abutment portion 132, and communicates with the passage 120 the cable passage tube 12. The fiber optic cable 10 is inserted into the passage 120 through the through hole 130.

Because the tail part 122 of the cable passage tube 12 is curved, the fiber optic cable 10 can be bent nearly 90 degrees in the cable passage tube 12. However, because the limiting member 13 is fixed to the cable passage tube 12, the fiber optic cable 10 is rigidly held in the tail part 122 and is limited from moving slightly. Besides, due to the tail part 122, application of the existing fiber optic cable splice device 1 is limited. Moreover, when the threaded portion 112 of the sleeve 11 is connected to a fitting device (not shown) by rotating the sleeve 11, the tail part 122 and the fiber optic cable 10 will inevitably rotate together with the sleeve 11. Since the tail part 122 and the fiber optic cable 10 are radially distant from a rotation axis (X) of threaded portion 112 of the sleeve 11, rotation of the tail part 122 and the fiber optic cable 10 will occupy a large space and thus can interfere with the space where the existing fiber optic splice device 1 is placed. Therefore, it is impossible or inconvenient to use or operate the existing fiber optic cable splice device 1 in a narrow space.

SUMMARY

Therefore, an object of the disclosure is to provide an optical fiber cable splice device that provides versatile uses and that is beneficial for operation in a narrow space.

According to the disclosure, a fiber optic cable splice device includes a cable passage unit and a connection unit detachably connected to the cable passage unit.

The cable passage unit includes a sleeve, an inner tube and a limiting member. The sleeve has a main portion, a receiving space surrounded by the main portion, and a lower hollow screw portion disposed at a lower end of the main portion. The main portion has an upper threaded section formed at an upper end of the main portion. The inner tube is received in the main portion and the lower hollow screw portion, and has an inlet passage configured to allow passage of a fiber optic cable. The limiting member is threadedly coupled to the upper thread section, and limits the inner tube within the receiving space.

The connection unit includes a casing and a rotary connection member. The casing has a top end, a bottom end, a sidewall extending downward from the top end to the bottom end, an internally threaded section formed in the top end, a joining portion extending sideward from the sidewall, and a bent passage formed within the casing and extending through the internally threaded section and the joining portion. The lower hollow screw portion of the cable passage unit is threadedly connected to the internally threaded section of the casing. The bent passage extends downward from the internally threaded section and turns sideward to extend through the joining portion. The rotary connection member is rotatably positioned on the joining portion, and has a sleeve portion sleeved on the joining portion, a threaded plug extending from the sleeve portion, and an outlet passage surrounded by the threaded plug and communicating with the bent passage.

When the rotary connection member is rotated relative to the casing, the threaded plug is able to be threaded into a fitting device so that the fiber optic cable is connected to the fitting device.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
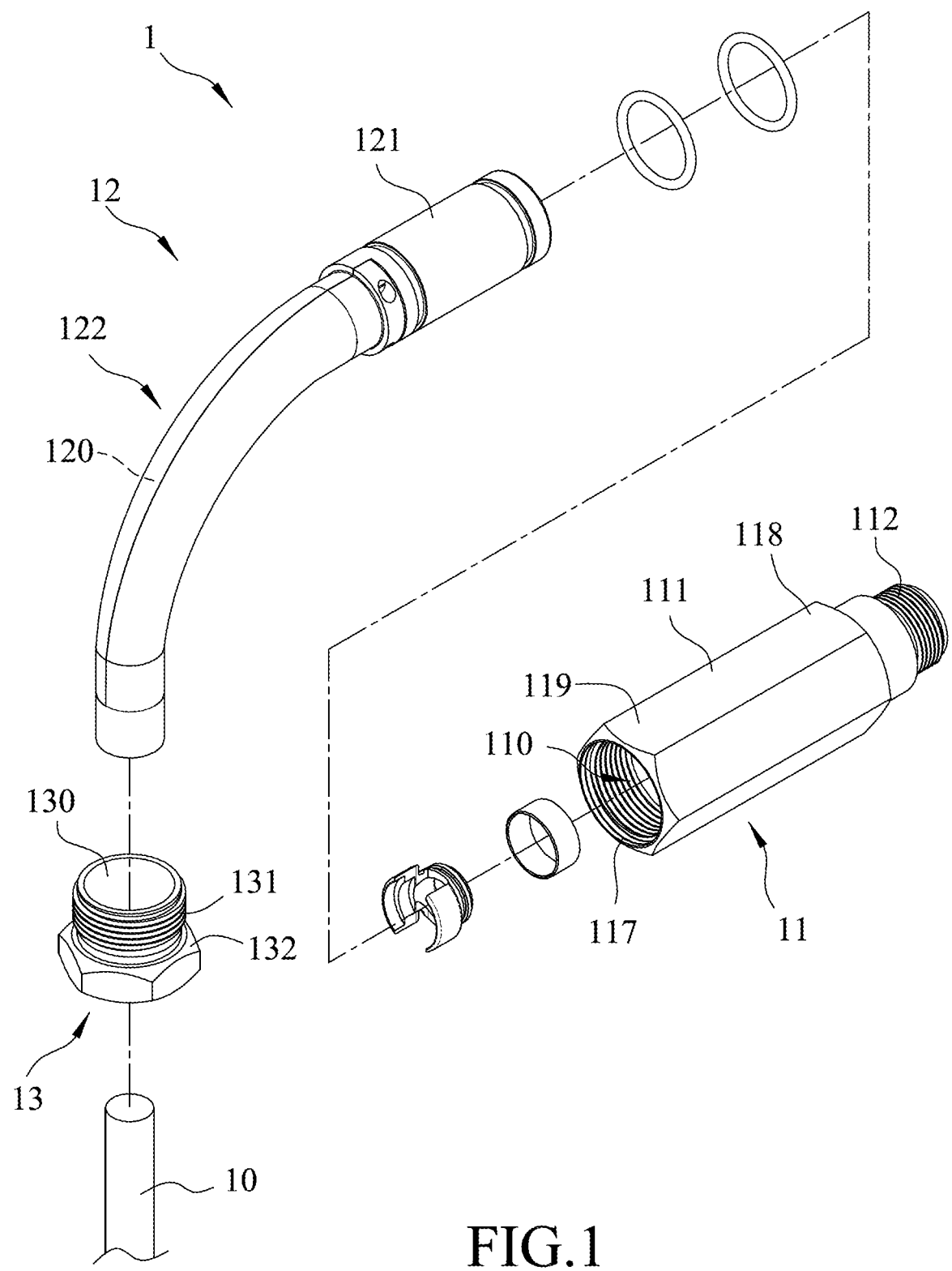
FIG. 1 is a perspective view of an existing fiber optic cable splice device.
Figure 2:
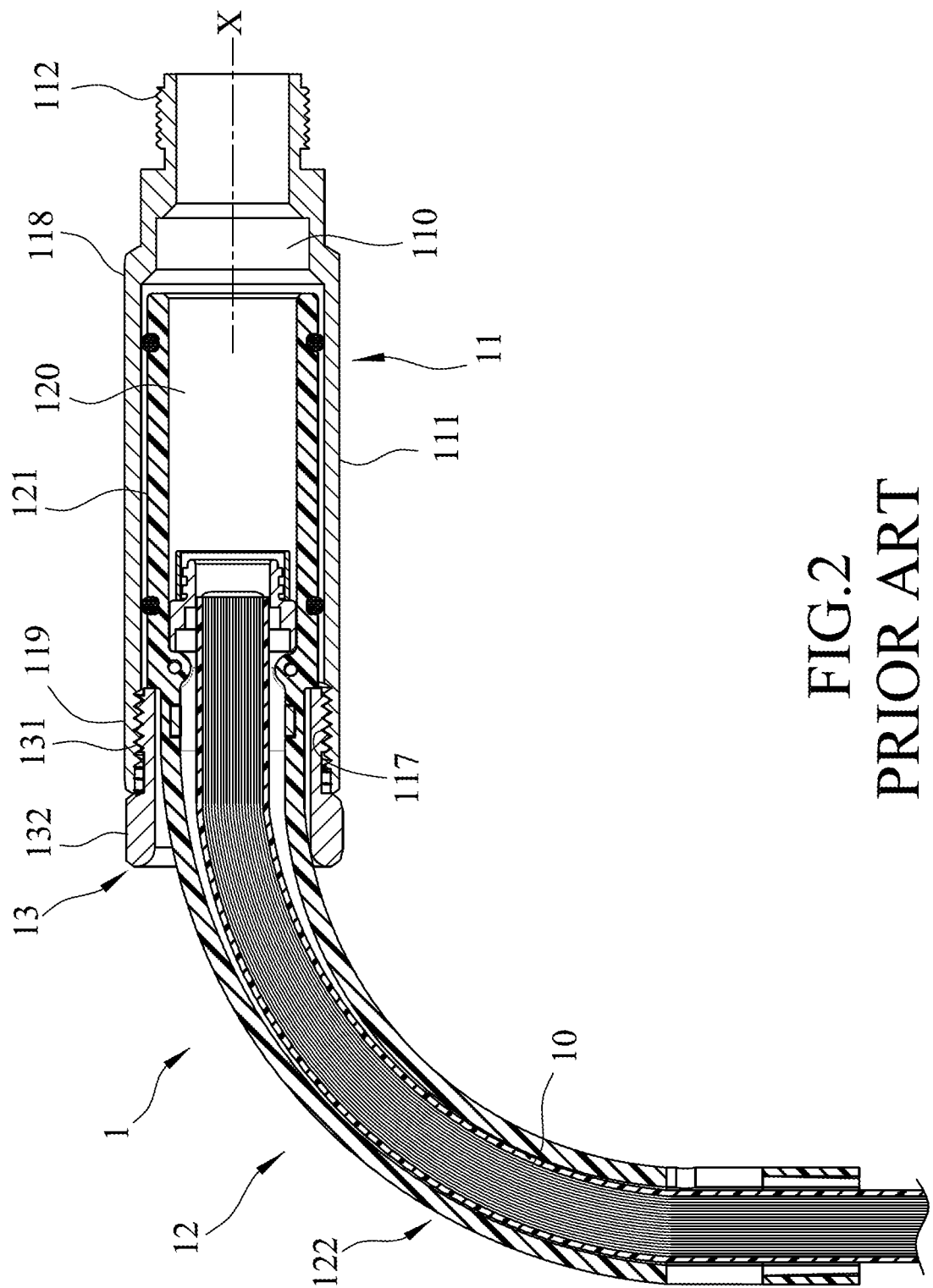
FIG. 2 is a sectional view of the existing fiber optic cable splice device.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
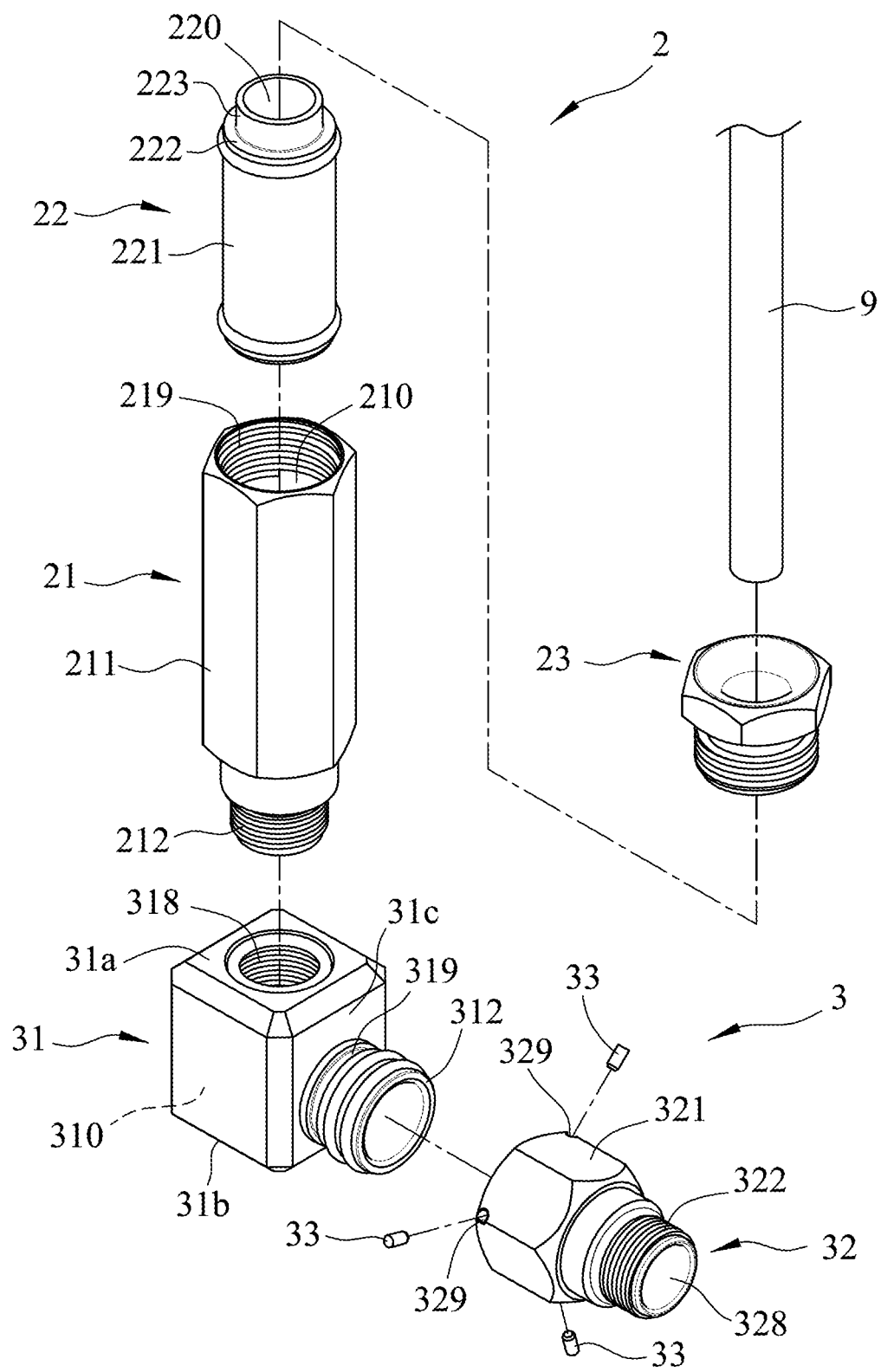
FIG. 3 is an exploded perspective view illustrating a first embodiment of a fiber optic cable splice device according to the disclosure.
Figure 4:
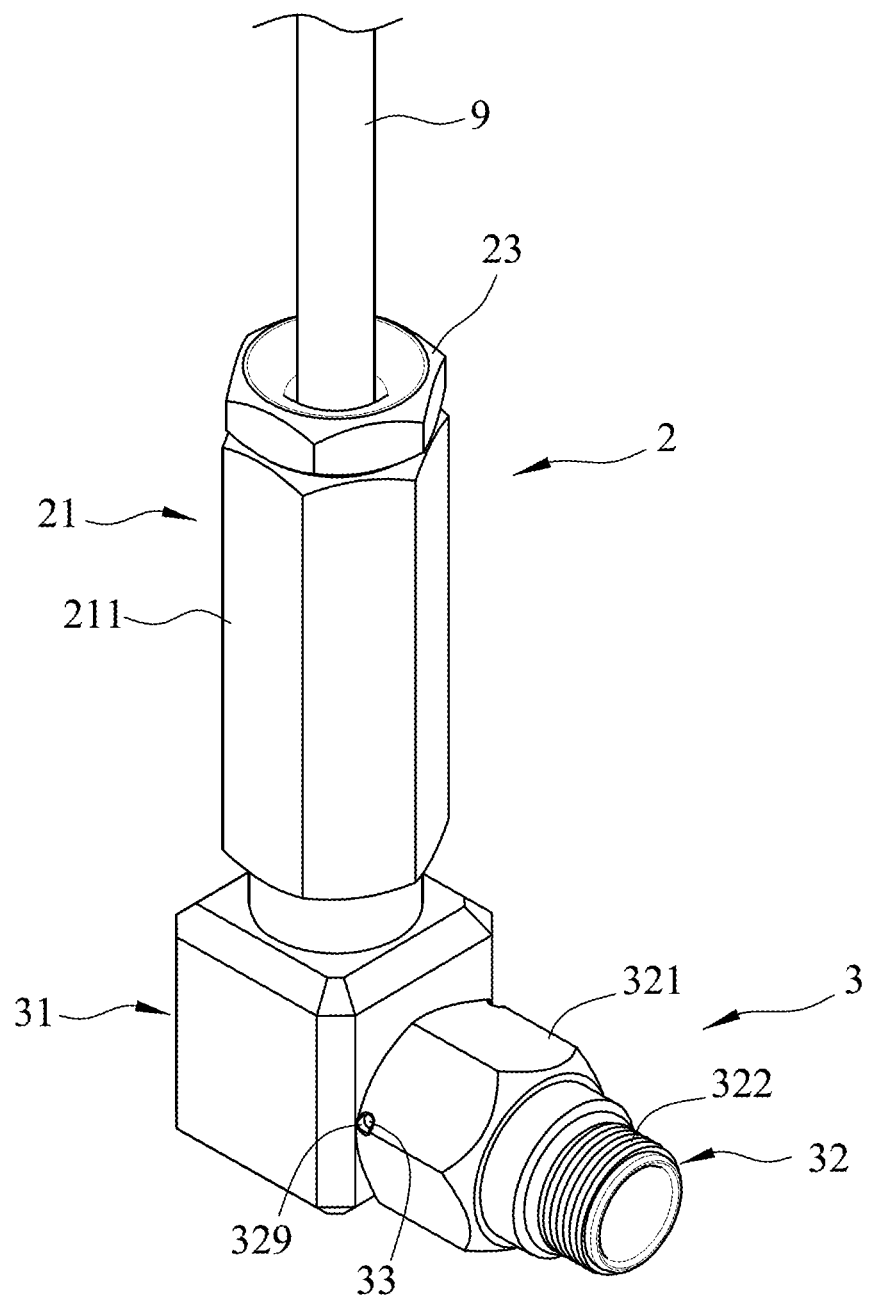
FIG. 4 is a perspective view of the first embodiment.

FIGS. 3 to 4 illustrate a first embodiment of a fiber optic cable splice device according to the disclosure suitable for passage of a fiber optic cable 9. The fiber optic cable splice device includes a cable passage unit 2 and a connection unit 3 detachably connected to the cable passage unit 2. The fiber optic cable 9 is allowed to pass through the cable passage unit 2 and the connection unit 3 to connect a fitting device 8 (shown in FIG. 6), so that a cable 81 of the fitting device 8 is connected to the fiber optic cable 9.

Figure 5:
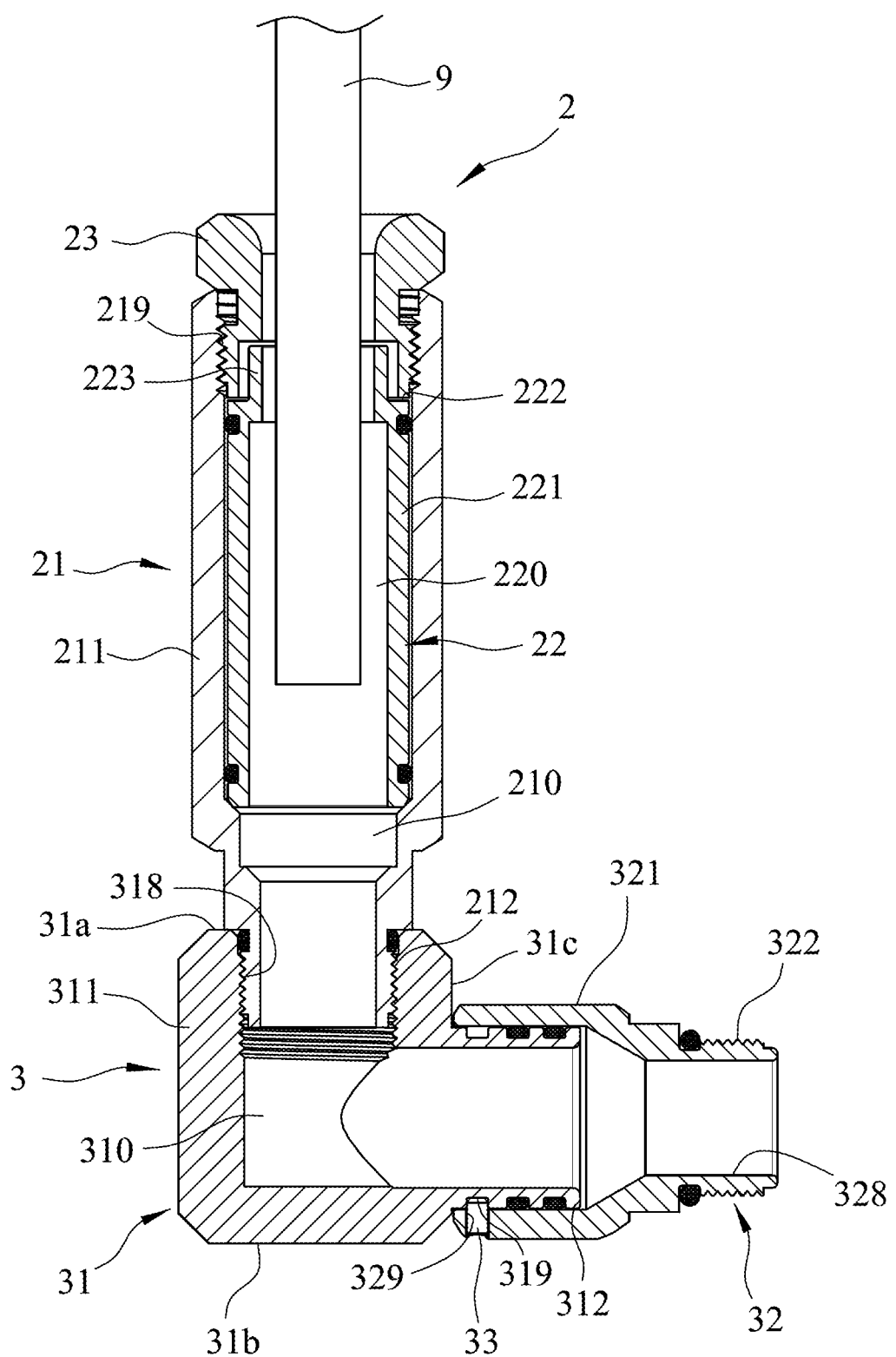
FIG. 5 is a sectional view of the first embodiment.

As shown in FIGS. 3 to 5, the cable passage unit 2 includes a sleeve 21, an inner tube 22 and a limiting member 23. The sleeve 21 has a main portion 211, a receiving space 210 surrounded by the main portion 211, and a lower hollow screw portion 212 disposed at a lower end of the main portion 211. The main portion 212 has an upper threaded section 219 formed at an upper end of the main portion 211. The inner tube 22 is received in the receiving space 210. The inner tube 22 includes a tube body 221, a shoulder part 222 extending radially and inwardly from an end of the tube body 221, a neck part 223 extending axially from the shoulder part 222 in a direction away from the tube body 221, and an inlet passage 220 extending through the neck part 223, the shoulder part 222 and the tube body 221 to allow passage of the fiber optic cable 9. The limiting member 23 is threadedly coupled to the upper threaded section 219, and abuts the shoulder part 222 to position and limit the inner tube 22 within the receiving space 210.

The connection unit 3 includes a casing 31, a rotary connection member 32, and three positioning members 33. The casing 31 has a top end 31a, a bottom end 31b, a sidewall 31c extending downward from the top end 31a to the bottom end 31b, an internally threaded section 318 formed in the top end 31a, a joining portion 312 extending sideward from the sidewall 31c, a bent passage 310 formed within the casing 31 and extending through the internally threaded section 318 and the joining portion 312, and a positioning groove 319 annularly formed in an outer surface of the joining portion 312. The lower hollow screw portion 212 of the sleeve 21 is threadedly connected to the internally threaded section 318 of the casing 31. The bent passage 310 extends downward from the internally threaded section 318 in communication with the receiving space 210 of the sleeve 21 and the inlet passage 220 of the inner tube 22, and turns sideward at 90 degrees to extend through the joining portion 312. The rotary connection member 32 is rotatably positioned on the joining portion 312, and has a sleeve portion 321 sleeved on the joining portion 312, a threaded plug 322 extending away from the sleeve portion 321, an outlet passage 328 surrounded by the threaded plug 322 and communicating with the bent passage 310, and three radial holes 329 radially extending through the sleeve portion 321 and communicating with the positioning groove 319. The positioning members 33 respectively extend through the positioning holes 329 into the positioning grooves 319, so that the sleeve portion 321 is positioned to the joining portion 312. When the rotary connection member 32 is rotated, because the positioning members 33 are moved along the positioning groove 319, the casing 31 does not rotate together with the rotary connection member 32.

Figure 6:
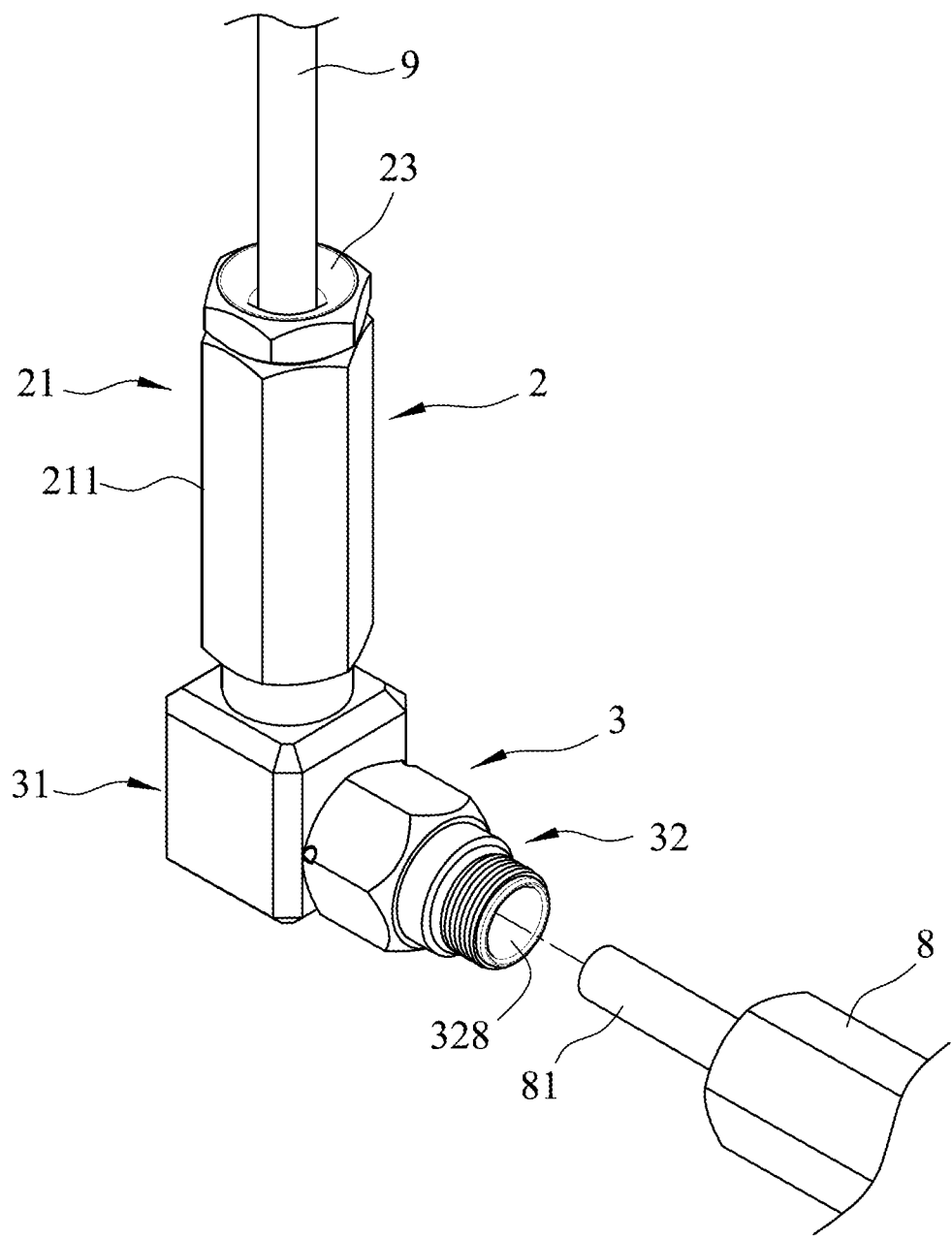
FIG. 6 is a perspective view of the first embodiment illustrating a connection unit of the fiber optic cable splice device being connected to a fitting device.

As shown in FIGS. 5 and 6, by virtue of the bent passage 310, the fiber optic cable 9 is allowed to bend at 90 degrees toward the fitting device 8. When the rotary connection member 32 is rotated relative to the casing 31, the threaded plug 322 is threaded into the fitting device 8 so that the fiber optic cable 9 is connected to the fitting device 8. During rotation of the rotary connection member 32, the casing 31, even together with the cable passage unit 2, needs not rotate along with the rotary connection member 32, and the cable 81 of the fitting device 8 extends through the outlet passage 328 of the rotary connection member 32 and is connected to the fiber optic cable 9 within the bent passage 310 of the casing 31. In practice, because only the rotary connection member 32 is rotated relative to the casing 31, the optical fiber cable splice connector of the disclosure can connect the fiber optic cable 9 to the fitting device 8 in any narrowed space which is accessible by the rotary connection member 32.

Figure 7:
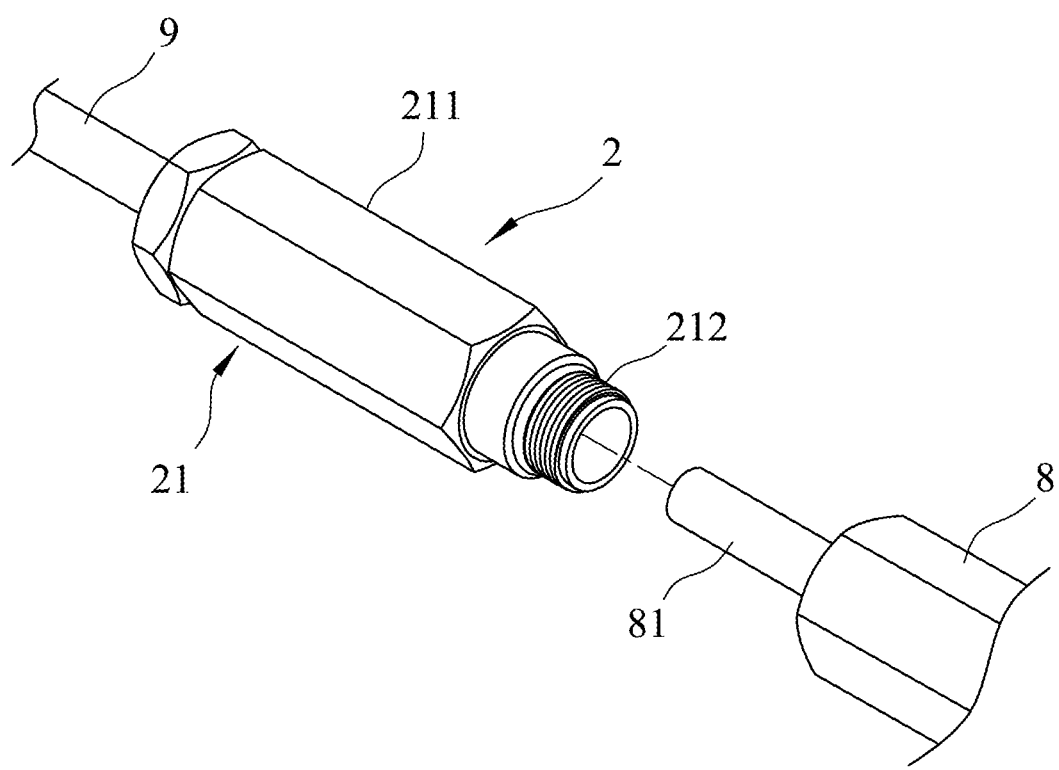
FIG. 7 is a perspective view of the first embodiment illustrating that a cable passage unit of the fiber optic cable splice device is connected to the fitting device and the connection unit is removed from the cable passage unit.

Referring to FIG. 7, in combination of FIG. 3, when the fiber optic cable 9 is laid straight and is arranged to connect with the cable 81 of the fitting device 8, the connection unit 3 may be removed from the cable passage unit 2. Because the lower hollow screw portion 212 of the sleeve 21 can be directly and threadedly connected to the fitting device 8, utility of the fiber optic cable splice device of the disclosure is versatile.

Figure 8:
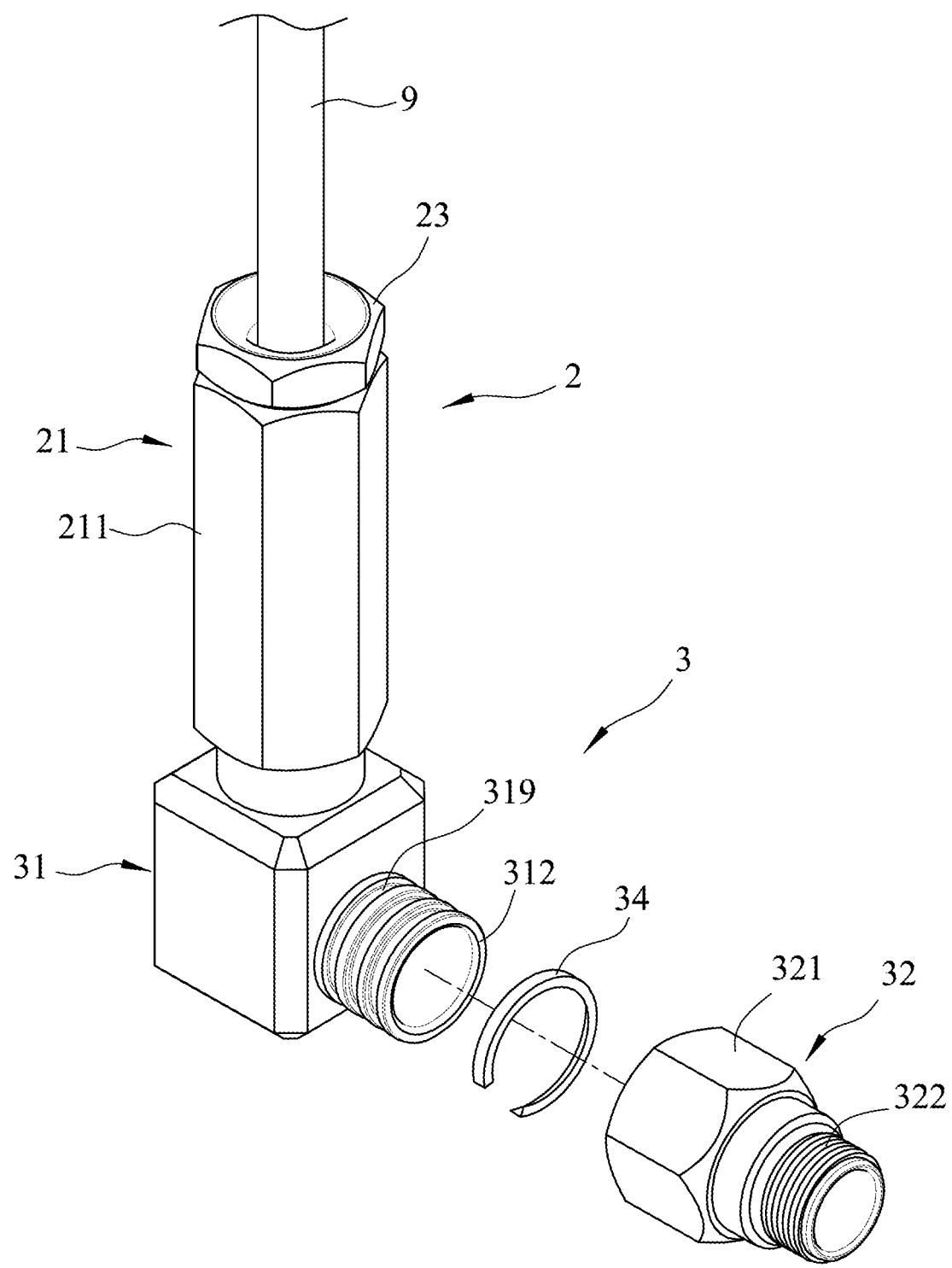
FIG. 8 is an exploded perspective view illustrating a second embodiment of a fiber optic cable splice device according to the disclosure.
Figure 9:
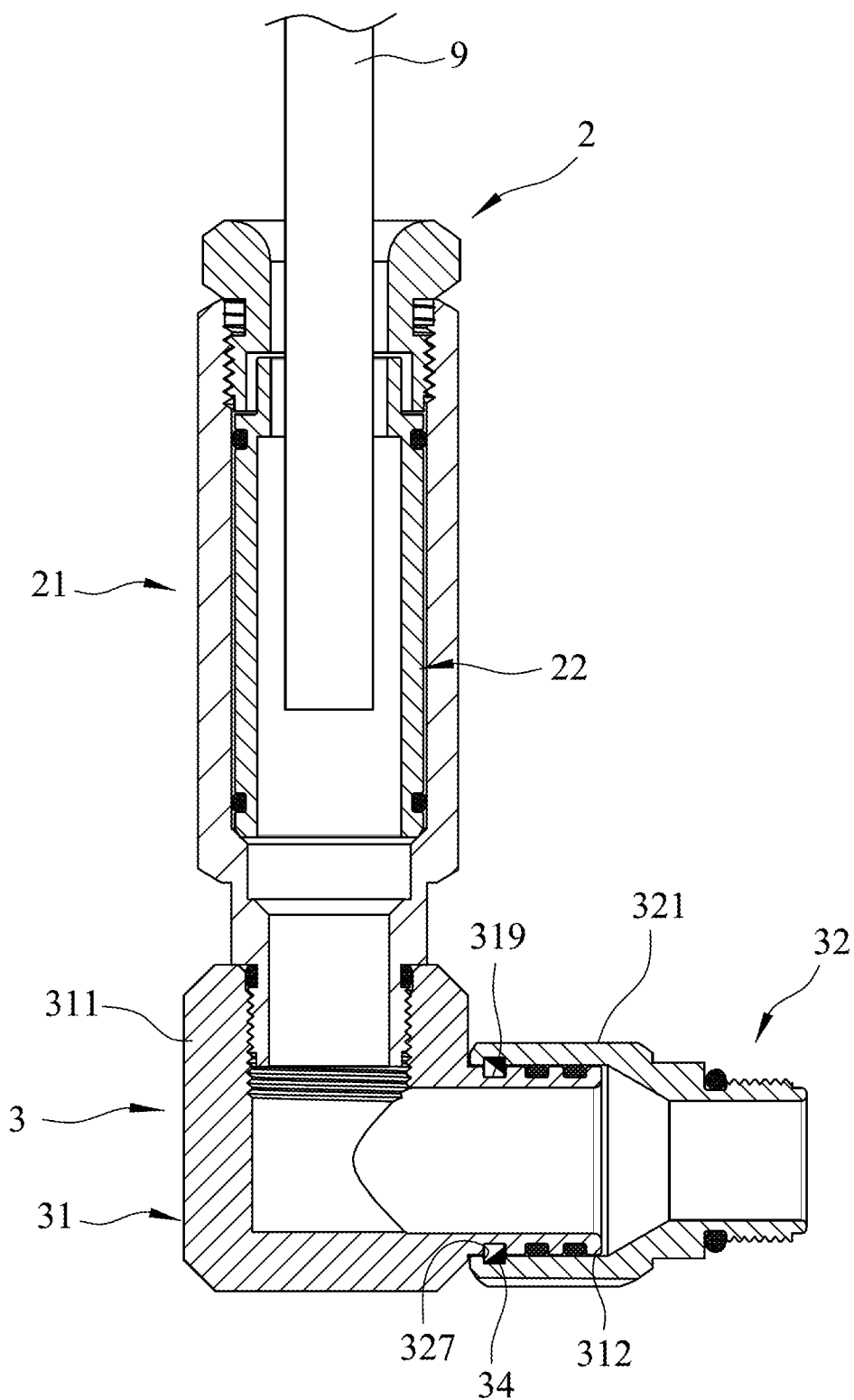
FIG. 9 is a sectional view of the second embodiment.

FIGS. 8 and 9 illustrate a second embodiment of a fiber optic cable splice device according to the disclosure, which has a general structure similar to that of the first embodiment. However, in this embodiment, the rotary connection member 32 further has a limiting groove 327 formed in an inner surface of the sleeve portion 321 of the rotary connection member 32 and aligned with the positioning groove 319. In addition, the connection unit 3 further includes a positioning ring 34 between the positioning groove 319 and the limiting groove 327. By virtue of the positioning ring 34 between the positioning groove 319 and the limiting groove 327, the sleeve portion 321 of the rotary connection member 32 is sleeved on and positioned to the joining portion 312 of the casing 31. When the rotary connection member 32 is rotated relative to the casing 31, the positioning ring 34 is moved between the positioning groove 319 and the limiting groove 327 and the casing 31 does not rotate together with the rotary connection member 32.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A fiber optic cable splice device, comprising:
a cable passage unit including
- a sleeve having a main portion, a receiving space surrounded by said main portion, and a lower hollow screw portion disposed at a lower end of said main portion, said main portion having an upper threaded section formed at an upper end of said main portion,
- an inner tube received in said main portion and said lower hollow screw portion, and having an inlet passage configured to allow passage of a fiber optic cable, and
- a limiting member threadedly coupled to said upper thread section, and limiting said inner tube within said receiving space; and a connection unit detachably connected to said cable passage unit, and including
- a casing having a top end, a bottom end, a sidewall extending downward from said top end to said bottom end, an internally threaded section formed in said top end, a joining portion extending sideward from said sidewall, and a bent passage formed within said casing and extending through said internally threaded section and said joining portion, said lower hollow screw portion of said cable passage unit being threadedly connected to said internally threaded section of said casing, said bent passage extending downward from said internally threaded section and turning sideward to extend through said joining portion, and
- a rotary connection member rotatably positioned on said joining portion, and having a sleeve portion rotatably sleeved on said joining portion, a threaded plug extending from said sleeve portion, and an outlet passage surrounded by said threaded plug and communicating with said bent passage, wherein when said rotary connection member is rotated relative to said casing, said threaded plug is able to be threaded into a fitting device so that the fiber optic cable is connected to the fitting device.

2. The fiber optic cable splice device as claimed in claim 1, wherein said casing further has a positioning groove annularly formed in an outer surface of said joining portion, said rotary connection member further having a plurality of radial holes radially extending through said sleeve portion and communicating with said positioning groove, said connection unit further including a plurality of positioning members respectively extending through said positioning holes into said positioning groove.

3. The fiber optic cable splice device as claimed in claim 1, wherein said casing further has a positioning groove annularly formed in an outer surface of said join portion, said rotary connection member further having a limiting groove formed in an inner surface of said sleeve portion and aligned with said positioning groove, said connection unit further including a positioning ring between said positioning groove and said limiting groove.

4. The fiber optic cable splice device as claimed in claim 1, wherein said inner tube includes a tube body, a shoulder part extending radially and inwardly from an end of said tube body, and a neck part extending axially from said shoulder part in a direction away from said tube body, said limiting member abutting said shoulder part to position said inner tube within said receiving space.

* * * * *